(12) United States Patent
Inoue et al.

(10) Patent No.: US 6,763,311 B2
(45) Date of Patent: *Jul. 13, 2004

(54) SHAKING TEST APPARATUS AND METHOD FOR STRUCTURES

(75) Inventors: Masahiko Inoue, Chiyoda (JP); Toshihiko Horiuchi, Ushiku (JP); Yasuyuki Momoi, Ushiku (JP); Takao Konno, Minori (JP); Wataru Yamagishi, Abiko (JP)

(73) Assignee: Hitachi, Ltd., Tokyo (JP)

( * ) Notice: Subject to any disclaimer, the term of this patent is extended or adjusted under 35 U.S.C. 154(b) by 248 days.

This patent is subject to a terminal disclaimer.

(21) Appl. No.: 10/034,306

(22) Filed: Jan. 3, 2002

(65) Prior Publication Data

US 2002/0059034 A1 May 16, 2002

Related U.S. Application Data

(63) Continuation of application No. 09/526,207, filed on Mar. 15, 2000, now Pat. No. 6,341,258.

(30) Foreign Application Priority Data

Mar. 15, 1999 (JP) ............................................. 11-67841

(51) Int. Cl.[7] ............................................. G01F 17/00
(52) U.S. Cl. ............................. 702/56; 702/33; 367/72; 367/73; 434/299; 703/10; 73/786
(58) Field of Search ..................... 702/56, 33; 367/72, 367/73; 434/299; 703/10; 73/786

(56) References Cited

U.S. PATENT DOCUMENTS

| | | | | |
|---|---|---|---|---|
| 5,388,056 A | * | 2/1995 | Horiuchi et al. | 702/56 |
| 5,737,239 A | * | 4/1998 | Horiuchi et al. | 702/56 |
| 5,777,236 A | * | 7/1998 | Walls | 73/786 |
| 5,841,040 A | * | 11/1998 | Walls | 73/789 |
| 6,341,258 B1 | * | 1/2002 | Inoue et al. | 702/56 |

FOREIGN PATENT DOCUMENTS

| | | | | |
|---|---|---|---|---|
| JP | 5-10846 | | 1/1993 | |
| JP | 5-142089 | | 6/1993 | |
| JP | 5-332876 | | 12/1993 | |
| JP | 05332876 A | * | 12/1993 | ............ G01M/7/02 |
| JP | 8-82571 | | 3/1996 | |
| JP | 10-339685 | | 12/1998 | |

* cited by examiner

*Primary Examiner*—John Barlow
*Assistant Examiner*—Anthony T. Dougherty
(74) *Attorney, Agent, or Firm*—Antonelli, Terry, Stout & Kraus, LLP

(57) ABSTRACT

A calculating device and method provided for a shaking test apparatus for carrying out a shaking test on a structure by using a partial structure and a numerical model which is virtually connected to the partial structure. The calculating device includes a calculation part which identifies a vibration model corresponding to the partial structure on the basis of displacement and reaction force detected in response to shaking and which combines the vibration model and the numerical model with each other to construct a model of the overall system corresponding to the structure and calculates the shaking response of the overall system model.

3 Claims, 7 Drawing Sheets

SHAKING TEST APPARATUS AND METHOD FOR STRUCTURES

CROSS REFERENCE TO RELATED APPLICATION

This is a continuation of U.S. application Ser. No. 09/526,207, filed Mar. 15, 2000, now U.S. Pat. No. 6,341,258, the subject matter of which is incorporated by reference herein.

BACKGROUND OF THE INVENTION

The present invention relates to a shaking test apparatus and a shaking test method in which a part of a structure is shaken (vibrated) by a shaker (vibrator) to perform a shaking test on the structure, and the whole structure is numerically modeled and analyzed on the basis of the shaking test result thus obtained.

A shaking test on a structure has been hitherto performed by vibrating (shaking) the whole structure of a read object or a model of the whole structure of a model of the object using a shaker (vibrator) According to this method, every time a structure is partially improved or the specification thereof is changed, it is necessary to carry out a shaking test on the whole structure once again, and thus the cost and time required for developments increase more and more. In the case of a large-scale structure, it is difficult to perform the shaking test on the whole structure because of limitation of the capacity of the shaker. In order to avoid this disadvantage, there has been recently proposed a method of using both a shaking test and a modal analysis in combination on the basis of the building block approach.

For example, in Japanese Laid-open Patent Application No. Hei-8-82571, it is suggested that the whole structure should be subjected to a shaking test in advance to determine the shaking modes of the whole structure and then a finite element analysis is applied to an altered place of the whole structure to correct the shaking modes of the whole structure, thereby estimating shaking responses. Further, in a collection of papers of "Japan Society of mechanical Engineers" (C-edition), Vol. 63, No. 616 (1997-12), pp 4134–4139, it is proposed that a model of a partial structure should be determined by experimental modal analysis, the model thus determined and numerical models of the other parts of the structure are then combined to simulate the overall system, and then the partial structure is shaken using the simulation result. Further, in Japanese Laid-open Patent Application No. Hei-5-10846, it is proposed that a partial structure should be subjected to the shaking test and the portions other than the partial structure are then subjected to modal analysis by using the numerical models thereof, thereby performing both the shaking test and the modal analysis in cooperation with each other.

In the case of the method disclosed in the Japanese Laid-open Patent Application No. Hei-8-82571, the altered portion is handled by numerically modeling it and thus various alterations can be easily made. However, when the shaking characteristic of a partial structure is complicated, it is difficult to accurately model the partial structure.

In the case of the method disclosed in the collection of papers of "Japan Society of Mechanical Engineers" (C-edition) Vol. 63, No. 616 (1997-012), pp 4134–4139, since the shaking characteristic of the partial structure is first identified, it is difficult to apply this method to a case where the characteristic of the partial structure is varied in accordance with the shaking level or a case where the characteristic is varied due to shaking.

In the case of the method disclosed in Japanese Laid-open Patent Application No. Hei-5-10846, a measured response from a partial structure is directly used for time record calculations of the numerical model, and thus this method can support the variation of the characteristic of the object being examined. However, this method has a problem in that the response of the shaker is delayed.

SUMMARY OF THE INVENTION

The present invention has been implemented in view of the foregoing problems associated with the conventional techniques, and has an object to provide shaking test apparatus and a method of performing a shaking test for combining and estimating the shaking characteristic of a partial structure of an object under test obtained through a shaking test and the shaking response of the whole structure which is numerically modeled, thereby estimating-the shaking response with high precision.

Another object of the present invention is to enable estimation of the shaking response with high precision in a so-called hybrid shaking test for combining a partial structure and a numerical model to estimate the shaking response even when the shaking is carried out at a high frequency.

A further object of the present invention is to enable estimation of the shaking response for even a structure having a high non-linearity in a so-called hybrid shaking test for combining a partial structure and a numerical model to estimate the shaking response.

In order to attain the above objects, according to a first aspect of the present invention, a shaking test apparatus for carrying out a shaking test on a structure by using a partial structure and a numerical model which is virtually connected to the partial structure is characterized by comprising: shaking means for vibrating (shaking) the partial structure; displacement detection means for detecting the displacement of the partial structure thus shaken by the shaking means; load detection means for detecting a reaction force from the partial structure; and operation means for identifying a vibration model corresponding to the partial structure on the basis of the displacement and reaction force thus detected, combining the vibration model and the numerical model with each other to build the model of the whole system corresponding to the structure and operate the shaking response of the whole-system model.

In the shaking test apparatus, it is preferable that the operation means includes means for inputting an input signal when the shaking response of the whole-system model is operated, and the operation means is provided with shaking target selection means for changing the shaking condition of the partial structure to be shaken, and the shaking target selection means changes the shaking condition so that by using the same partial structure, the shaking test can be carried out on a different partial structure.

In order to attain the above objects, according to a second aspect of the present invention, a shaking test apparatus for carrying out a shaking test on a structure by using plural partial structures and a numerical model, which is virtually connected to the partial structures, comprises shaking means for shaking each of the partial structures; displacement detection means for detecting the displacement of the partial structures shaken by the shaking means; load detection means for detecting the reaction force from the partial structures, the shaking means, the displacement detection means and the load detection means being provided for each of the plural partial structures; and operation means for identifying the vibration models of the partial structures on the basis of the displacements and the reaction forces thus detected, combining the plural vibration models and the numerical model to construct the overall-system model corresponding to the structure, and calculating the vibration response of the overall-system model.

In order to attain the above objects, according to a third aspect of the present invention, a shaking test apparatus for carrying out a shaking test on a structure by using a partial structure and a numerical model which is virtually connected to the partial structure comprises: plural shaking means for shaking the partial structure; displacement detection means for detecting the displacement of the partial structure shaken by each of the shaking means; load detection means for detecting the reaction force from the partial structure, the displacement detection means and the load detection means being provided for each of the shaking means; and operation means for identifying the vibration models of the partial structure on the basis of the displacements and the reaction forces thus detected, combining the plural vibration models and the numerical model to construct the overall-system model corresponding to the structure, and calculating the vibration response of the overall-system model.

In order to attain the above objects, according to a fourth aspect of the present invention, a shaking test apparatus for carrying out a shaking test on a structure by using a partial structure and a numerical model which is virtually connected to the partial structure comprises: means for creating the vibration model corresponding to the partial structure: and a shaking apparatus for the partial structure for which correction data for correcting the vibration model can be obtained.

In order to attain the above objects, according to a fifth aspect of the present invention, a structure shaking test method for carrying out a shaking test on a structure by using a partial structure and a numerical model which is virtually connected to the partial structure comprises the steps of: creating the vibration model corresponding to the partial structure; creating an overall-system model comprising the vibration model and the numerical model; and correcting the overall-system model on the basis of the shaking test result of the partial structure.

In order to attain the above objects, according to a sixth aspect of the present invention, a structure shaking test method for carrying out a shaking test on a structure by using a partial structure and a numerical model which is virtually connected to the partial structure comprises: a first step of constructing the overall-system model corresponding to the structure from the vibration model corresponding to the partial structure and the numerical model; a second step of calculating a vibration response for the overall-system model constructed on the basis of a shaking input signal to be applied to the structure; a third step of generating a shaking signal of the partial structure on the basis of the vibration response and shaking the partial structure using a shaker; a fourth step of renewing and identifying the vibration model on the basis of the displacement and load of the partial structure thus shaken; a fifth step of reconstructing the overall-system model on the basis of the renewed vibration model; and a sixth step of calculating the vibration response for the overall-system model and repeating the third to sixth steps.

It is preferable that a step of preliminarily shaking the partial structure on the basis of any signal is provided to identify the vibration model prior to said first step, a plurality of vibration models are prepared, and the method is allowed to handle the plural vibration models by varying the shaking condition of the same shaking means.

DETAILED DESCRIPTION OF THE PREFERRED EMBODIMENTS

Preferred embodiments according to the present invention will be described hereunder with reference to the accompanying drawings.

Figure 1:
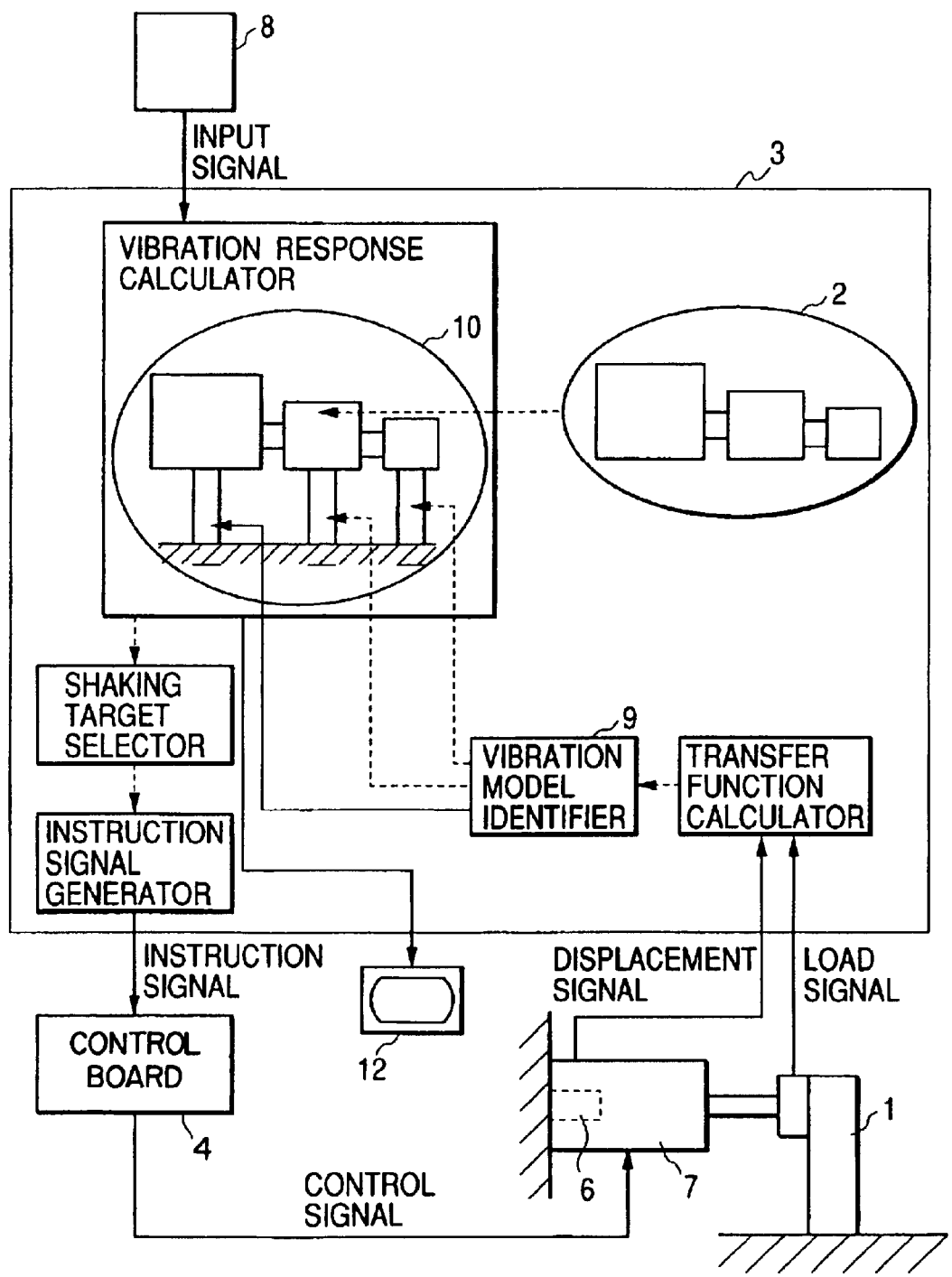
FIG. 1 is a schematic diagram showing an embodiment of a shaking test apparatus according to the present invention.
Figure 2:
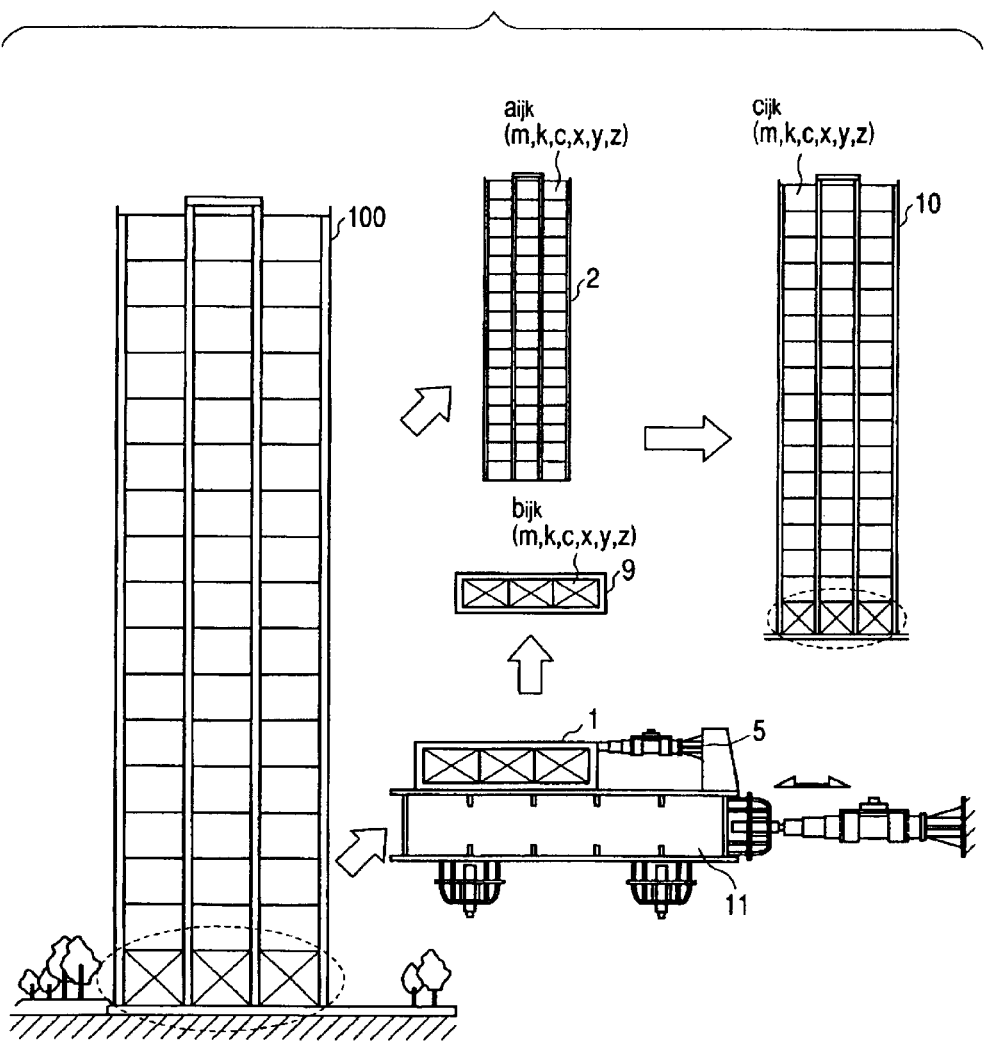
FIG. 2 is a diagram illustrating the principle of the present invention.
Figure 3:
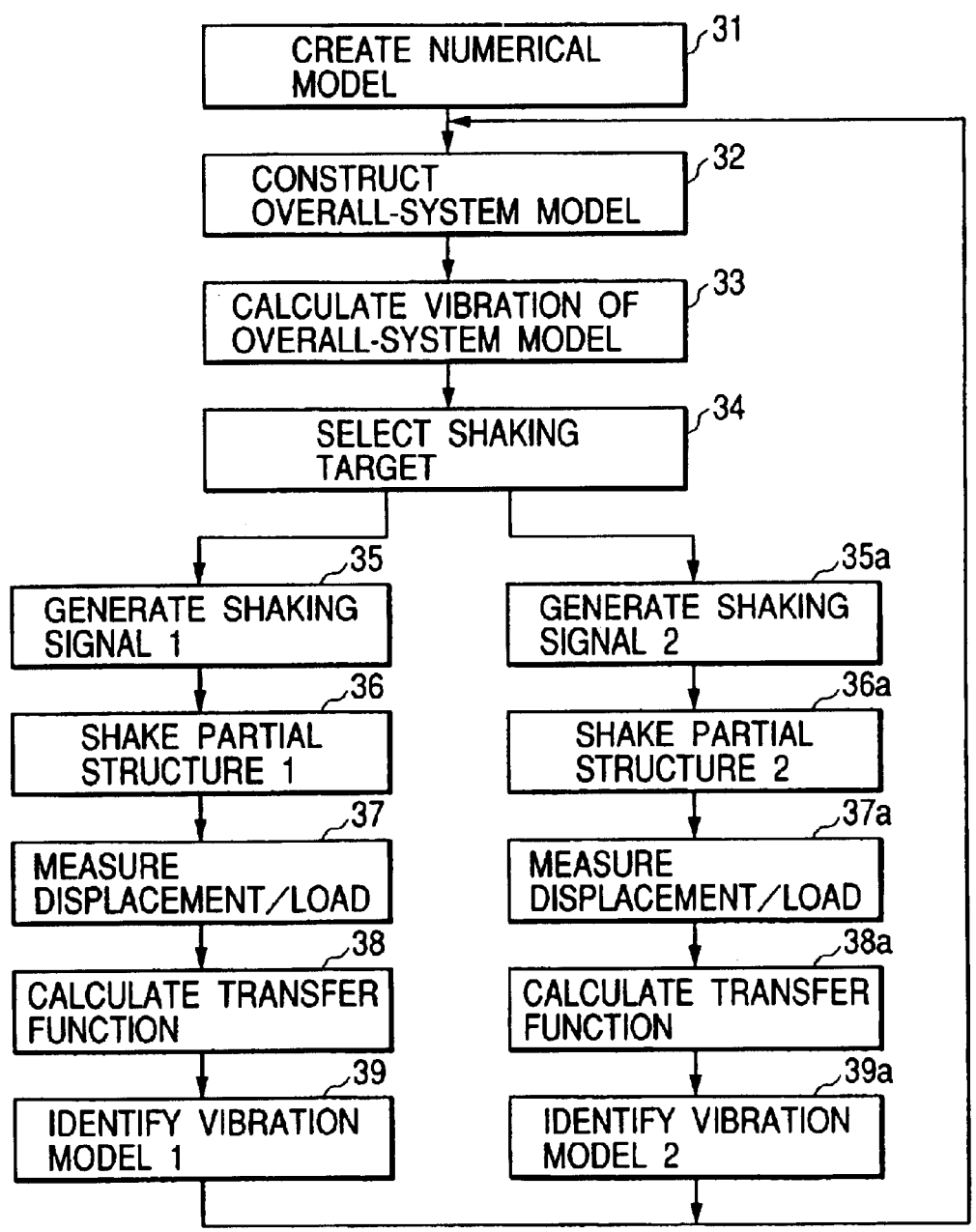
FIG. 3 is a flowchart showing an embodiment of a shaking test method based on the shaking test apparatus of FIG. 1.

FIG. 1 is a schematic diagram showing an embodiment of the present invention, which is applied to a case where the shaking response of a structure, such as a bridge, a building or the like, is estimated. FIG. 2 schematically shows the principle of the present invention, and FIG. 3 is a flowchart showing the estimation procedure.

As shown in FIG. 2, a part (a base portion in FIG. 2) of a structure 100 serving as an estimation target (a multistory building in FIG. 2) is constructed by an actual object or model. This part is called a "partial structure 1". The portion other than the partial structure 1 of the structure 100 may he numerically represented and is referred to as "numerical model 2". The numerical model 2 is divided into one or plural elements, and the spatial coordinate, mass, damping coefficient, spring constant, etc. ($a_{ijk}$(m,k,c,x,y,z)) are determined for each element.: These values are stored in a computer 3 for every element (step 31). The partial structure 1 is mounted on a shaking (shaking) table 11, and shaken by a shaker (vibrator) 5. The above process is the same as the so-called normal hybrid shaking test.

However, according to the method of the present invention, the partial structure 1 is also numerically modeled and stored into the computer 3 ($b_{ijk}$(m,k,c,x,y,z)). This is called "vibration model" 9. When a wheel system of a car is targeted as a vibration model 9, there may be provided plural vibration models 9.

The combination of the vibration model 9 and the numerical model 2 may be defined as a numerical model ($c_{ijk}$ (m, k, c, x, y, z)) of the structure 100 in a broad sense, and this is called an "overall-system model" 10 (step 32).

The partial structure 1 is virtually connected to the numerical model 2. A shaker 5 is provided in the neighborhood of the partial structure 1 and at the place corresponding to the boundary portion between the partial structure 1 and the numerical model 2. A built-in type displacement gauge (displacement detector) 6 is provided in the shaker 5 to measure a displacement occurring in the partial structure 1.

A load cell (load detector) 7 is mounted between the tip of the shaker 5 and the partial structure 1, and the load applied from the partial structure 1 to the shaker 5 is detected by the load cell 7. Further, a waveform oscillator 8 for producing waveforms, such as produced by an earthquake, etc. is connected to the computer 3.

After the overall-system model 10 is constructed, a desired input signal is input from the waveform oscillator 8 into the computer 3. The computer 3 calculates the response of the whole structure for the overall-system model 10 comprising the combination of the numerical model 2 and the vibration model 9 under the condition that external force is applied to the overall-system model 10 (step 33). The position of the external force may be set to the end face of the structure 100 or a point inside the structure 100. The displacement response at the boundary portion between the vibration model 9 and the numerical model 2 is calculated on the basis of the shaking response of the overall-system model 10.

Subsequently, when the structure 100 serving as a test target is symmetrical between right and left sides with respect to the center line in shape, for example, like a wheel system of a car, the shaking test may be performed by using the partial structure 1 containing one wheel, and the shaking test condition may be varied in accordance with the driving state of each of the right wheel and the left wheel. Therefore, the shaking target (driving condition) is selected in accordance with the left-wheel driving or the right-wheel driving (step 34). The computer 3 inputs the displacement response value of the boundary portion thus calculated as an instruction signal to a control board 4 in accordance with respective conditions (step 35). The control board 4 controls the shaking operation of the shaker 5 on the basis of the input value (step 36).

The displacement gauge 6 measures the displacement response of the partial structure 1, and the load cell 7 measures the load response (step 37). The displacement response and the load response thus measured are input to the computer 3 to determine the transfer function of the displacement and the load (step 38). On the basis of the transfer function thus determined, the shaking characteristic of the partial structure 1 under the shaking state can be grasped, and the damping coefficient and the spring constant of the vibration model 9 are renewed. This process is called "identification of vibration model" (step 39). When the partial structure 1 is paired with one which has been subject to experiment through the process from the step 35 to the step 39, the process from the step 35a to the step 39a is executed like the process from the step 35 to the step 39.

When the vibration model 9 of the partial structure 1 is identified, the shaking response is newly calculated for a newly-renewed overall-system model 10 comprising a new combination of a vibration model 9 and a numerical model 2. Subsequently, the above process is repeated. That is, the partial structure 1 is shaken in accordance with the response calculation result to obtain a transfer function. The shaking mode 1 of the partial structure 1 is identified again on the basis of the transfer function newly determined. Subsequently, the overall-system model 10 is renewed, and the response of the whole structure is calculated.

In this embodiment, two partial paired structures are picked up as shaking targets. However, the number of the partial structure(s) may be equal to 1, 3 or more. When the number of the partial structures is equal to 1, the step 24 is necessarily omitted. It is unnecessary to use the numerical model 2 for a structure 100 comprising a merely repetitive series of partial structures having the same structure. Furthermore, the shaking target may be switched every time the vibration model is identified, or it may be switched every time the error of the vibration model of one shaking target is converged to a fixed value or less. If the shaking target is switched every time the vibration model is identified, an advantage would be attained in that the shaking response of the structure can be considered while comparing the shaking responses of the two partial structures with each other. On the other hand, if the shaking target is switched every time the error is converged into a fixed value, the switching frequency can be reduced and the testing time can be shortened.

The switching operation of the shaking target shown in this embodiment may be suitably applied to mechanical structures such as wheel systems of bicycles, trains, etc., an apparatus for supporting a load object at plural points, a structure having bridges repetitively, a laminated structure having the same structures arranged in a laminate state, etc.

According to this embodiment, the response of the whole structure can be estimated with high precision by using one partial structure. Further, the variation in shaking response with variation in relative position at which the partial structure occupies in the whole structure can be easily determined. When the shaking state of a structure is regarded as being reproducible at plural places because the structure has symmetry or repetitiveness, the vibration model of the same partial structure identified can be applied to plural places without switching the shaking target.

By repeating the shaking of the partial structure 1 based on the response of the overall structure 100 and the renewal of the vibration model 9 based on the measurement of the transfer function, the vibration model 9 identified successively and the shaking state of the overall-system model 10 can be grasped with high precision. For example, when the characteristic of the partial structure 1 has a non-linearity, the effect of the portion other than the partial structure on the partial structure 1 is varied in accordance with the shaking state of the overall structure. Therefore, the behavior of the shaking response also varies. In this embodiment, even when the partial structure 1 has such a non-linearity, the shaking response can successively approach the true response state by correcting the shaking to be applied to the partial structure every time the vibration model of the partial structure is renewed.

Next, a method of constructing a model in the above embodiment will be described with reference to FIG. 4.

In order to simplify the description, it is assumed that only one partial structure is provided, the numerical model 2 and the partial structure 1 are connected to each other at one point $P_2$ and the external force acts on one point $P_1$ of the numerical model 2. As shown in the content of step 42, the numerical model 2 is connected to the partial structure 1 at point $P_2$, and the external force $F_1$ acts on the point $P_1$ of the numerical model. The transfer characteristic of the displacement $\{X\}$ and external force $\{F\}$ of the numerical model 2 is expressed in the equation of the step 41 by using known dynamic rigidity $\{K\}$. Here, $\{F\}$ denotes a matrix including $F_1$, $F_2$ as components, $\{X\}$ denotes a matrix including $X_1$, $X_2$ as components, and $\{K\}$ denotes a matrix including $K_{ij}$ (i=1, 2; j=1, 2) as components. The dynamic rigidity Ke of the partial structure 1 is determined by using the displacement Xe measured through the shaking test and the external force Fe to fix the vibration model 9 (steps 44, 45). These two types of dynamic rigidity are coupled to each other by using the building block approach. At this time, at the connection point $P_2$, the displacement of the numerical model 2 and the displacement of the partial structure 1 are equal to each other, and the load is represented by the sum of the load of the numerical model 2 and the load of the partial structure 1. Through this processing, the characteristic of the overall system can be obtained (step 42).

The response displacement to the external force is calculated by using the inverse matrix {H} of the dynamic rigidity matrix {K} (see the equation (c)) in the step 42). In this calculation, since the external force $F_{IN}$ acts on the point $P_1$, the displacement response at the boundary point $P_2$ between the numerical model 2 and the partial structure 1 is calculated with $F_1$ being set to be equal to $F_{IN}$ (step 43). The partial structure 1 is subjected to the shaking test in accordance with the displacement response thus calculated, and the dynamic rigidity is calculated (step 44).

In the shaking rest of the partial structure 1, deformation is applied to the partial structure 1 under the same condition as when the overall structure 100 is shaken. Accordingly, the transfer characteristic is kept under the same state as when the structure 100 is shaken. In order to more clearly approach the actual shaking state of the structure 100, the vibration model 9 is corrected and the response calculation is continued. If the vibration model 9 is corrected, the shaking condition of the partial structure 1 also varies and thus the response state of the partial structure 1 varies. When the partial structure 1 has a non-linearity or the like, the dynamic rigidity is varied. Therefore, the vibration model 9 is corrected again. By repeating this procedure, the response state can be reproduced in accordance with the input.

Figure 4:
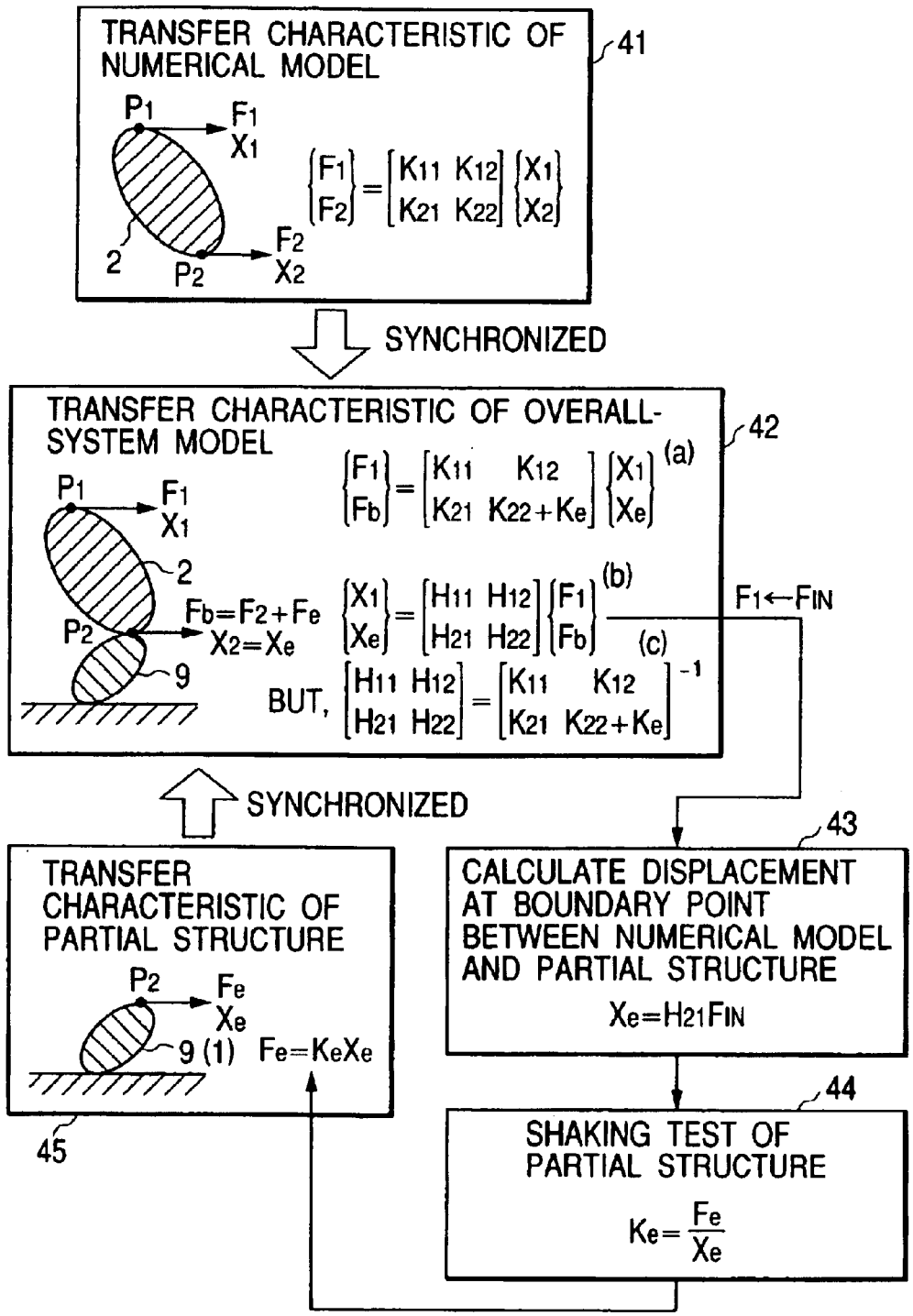
FIG. 4 is a conceptual diagram showing model construction in an embodiment of the present invention.
Figure 5:
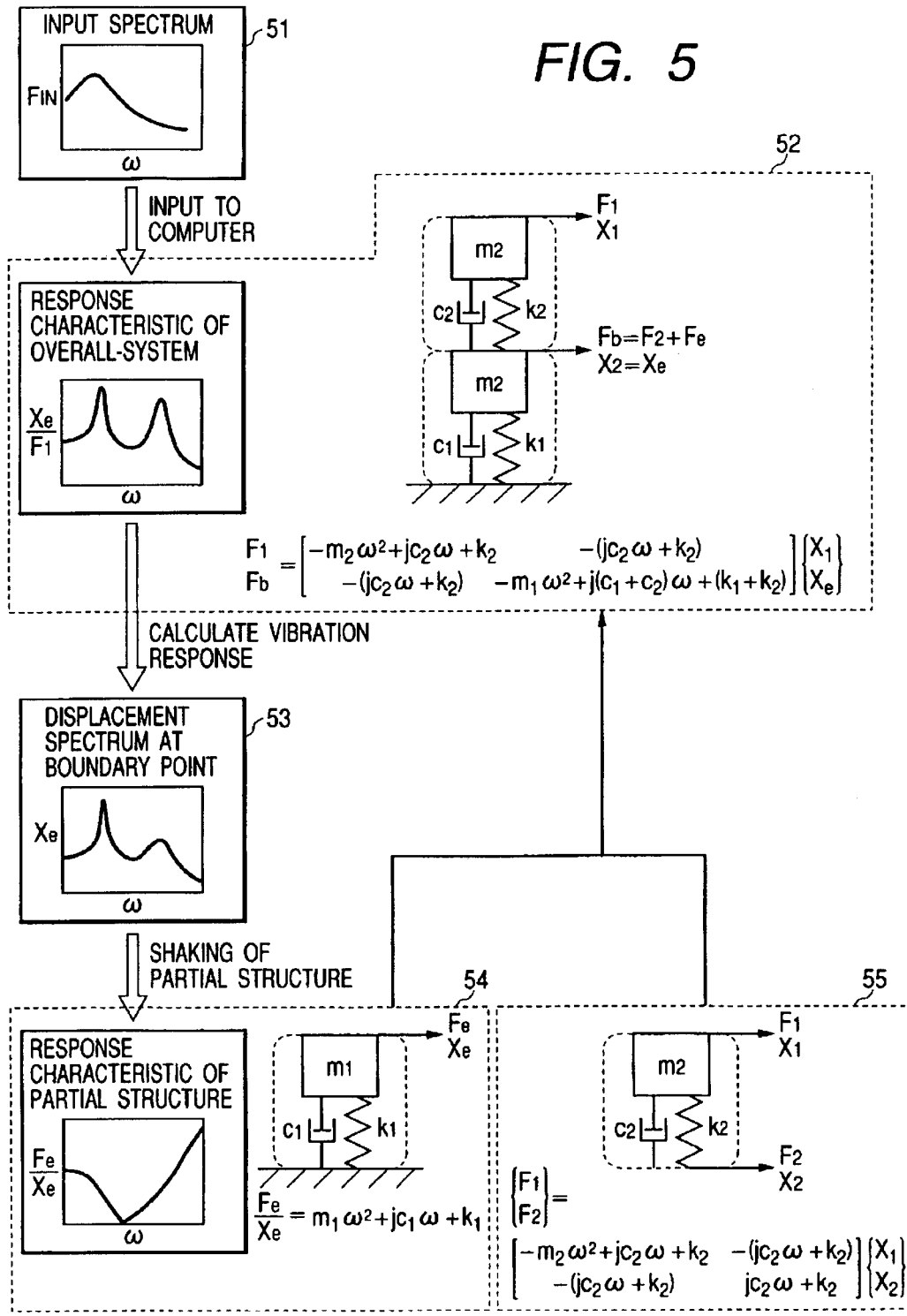
FIG. 5 is a flow diagram showing an embodiment of a shaking test method according to the present invention.

FIG. 5 shows a concrete method of determining a dynamic rigidity matrix when the external force in FIG. 4 is a spectral input. This procedure is also applied for the time record waveform. There is considered a system of two degrees of freedom such that both of the numerical model 2 and the partial structure 1 are set to a system of one degree of freedom. In FIG. 5, the upper side represents the numerical model 2, and the lower side represents the partial structure 1. Now, there is determined a response characteristic when an input having a spectrum which is characteristic of a specific earthquake is applied to the overall-system model 10, for example.

The response characteristic has two peaks for the system of two degrees of freedom. The input spectrum is multiplied by the response characteristic to obtain the displacement spectrum at the boundary point. In parallel to this calculation, the partial structure 1 is shaken in accordance with the displacement spectrum at the boundary point, thereby obtaining the characteristic spectrum of the partial structure 1 which corresponds to the displacement spectrum at the boundary point. The vibration model 9 of the partial structure 1 is identified by using the characteristic spectrum, and the numerical model 2 and the vibration model 9 are combined with each other to reconstruct the overall-system model 10. On the basis of the response characteristic of the overall-system model 10 thus reconstructed, the spectrum at the boundary point is varied and thus the shaking condition of the partial structure 1 is varied. As a result, a response characteristic which is nearer to the actual one can be obtained for the overall-system model being reconstructed. This calculation result may be monitored as a graph or video images of the vibration displacement of the structure 100 by monitor means 12 connected to the computer 3.

Figure 6:
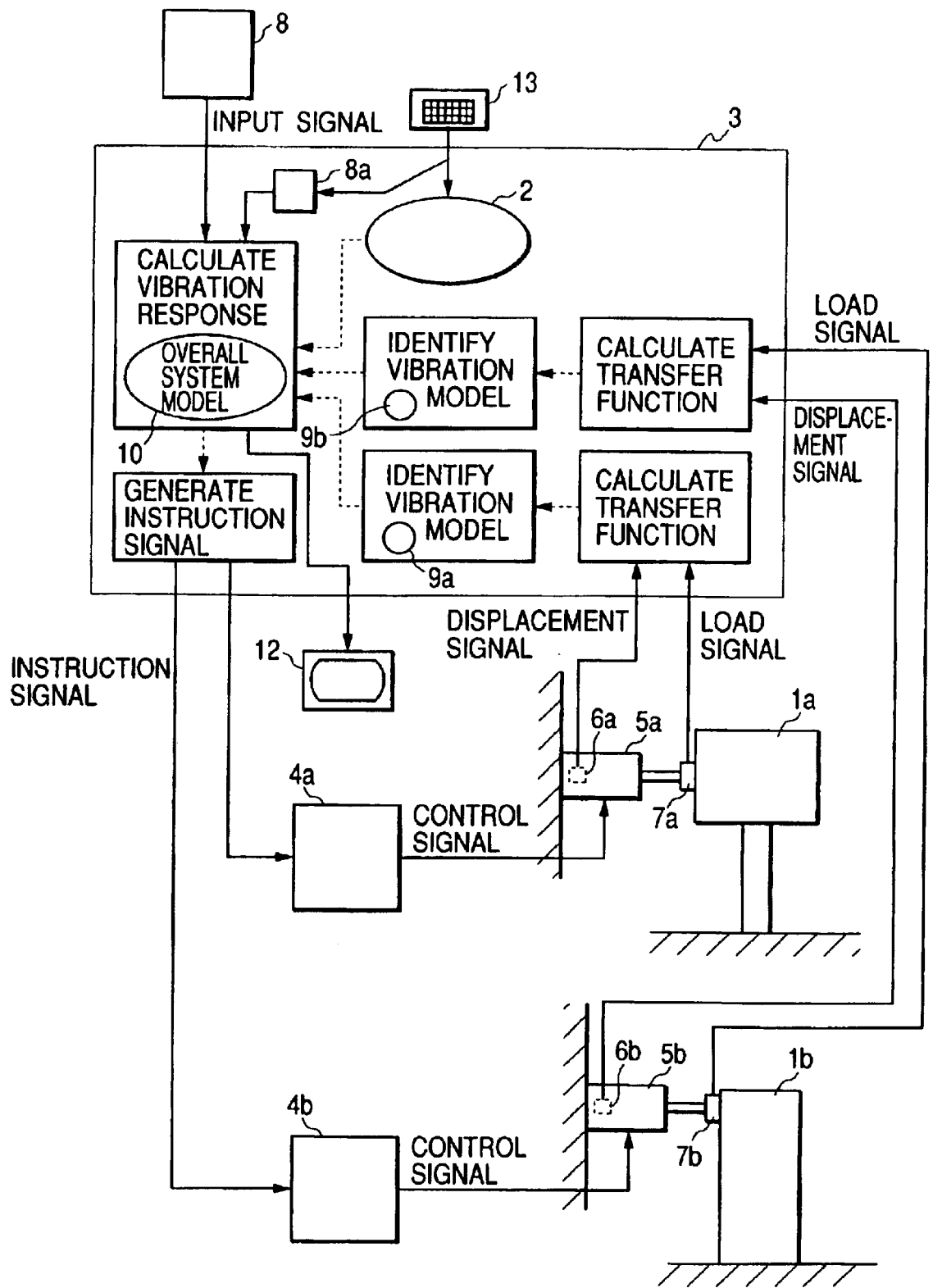
FIG. 6 is a schematic diagram showing another embodiment of the shaking test apparatus according to the present invention.

FIG. 6 shows another embodiment of the present invention. This embodiment is different from the above embodiment in that the structure 100 has two partial structures 1a and 1b and both the partial structures 1a and 1b are allowed to be shaken at the same time. This embodiment is more effectively applied when a plurality of partial structures to be subjected to shaking estimation exist in the structure 100.

That is, the partial structure 1a is mounted on a shaker 5a and the partial structure 1b is mounted on a shaker 5b. The portion other than the partial structures 1a and 1b is set as a numerical model 2, and data are input to the computer 3 by using the input means 13. The overall-system model 10 is constructed on the basis of the numerical model 2 and the vibration models 9a and 9b of the partial structures 1a and 1b identified for the input signal input from the waveform oscillator 8. The displacement at the boundary point between the partial structure 1a and the numerical model 1 and the displacement at the boundary point between the partial structure 1b and the numerical model 2 are calculated on the basis of the vibration calculation of the overall-system model 10. Instruction values to the respective control boards 4a, 4b are determined on the basis of the displacements at the boundaries, and input to the control boards 4a and 4b. The control board 4a controls the shaker 5b while the control board 4a controls the shaker 5a, and the shaker 5a shakes the partial structure 1a while the shaker 5b shakes the partial structure 1b. The displacement and load of the partial structure 1a are measured by a displacement gauge 6a and a load cell 7a and the data thereof are input to the computer 3 to determine the transfer function and identify the vibration model 9a. Likewise, the displacement and load of the partial structure 1b are measured by a displacement gauge 6b and a load cell 7b and the data thereof are input to the computer 3 to determine the transfer function and identify the vibration model 9b. The overall-system model 10 is reconstructed from the vibration models 9a, 9b of the partial structures 1a and 1b thus identified and the numerical model 2. This process is repeated. According to this embodiment, the estimation on the shaking response can be performed in consideration of the mutual effect between the partial structures 1a and 1b.

In the above embodiments, the shaking direction of the partial structure is set to only one horizontal direction. However, shakers whose number is equal to the number of degrees of freedom for estimation of shaking responses may be provided to shake the partial structures.

Figure 7:
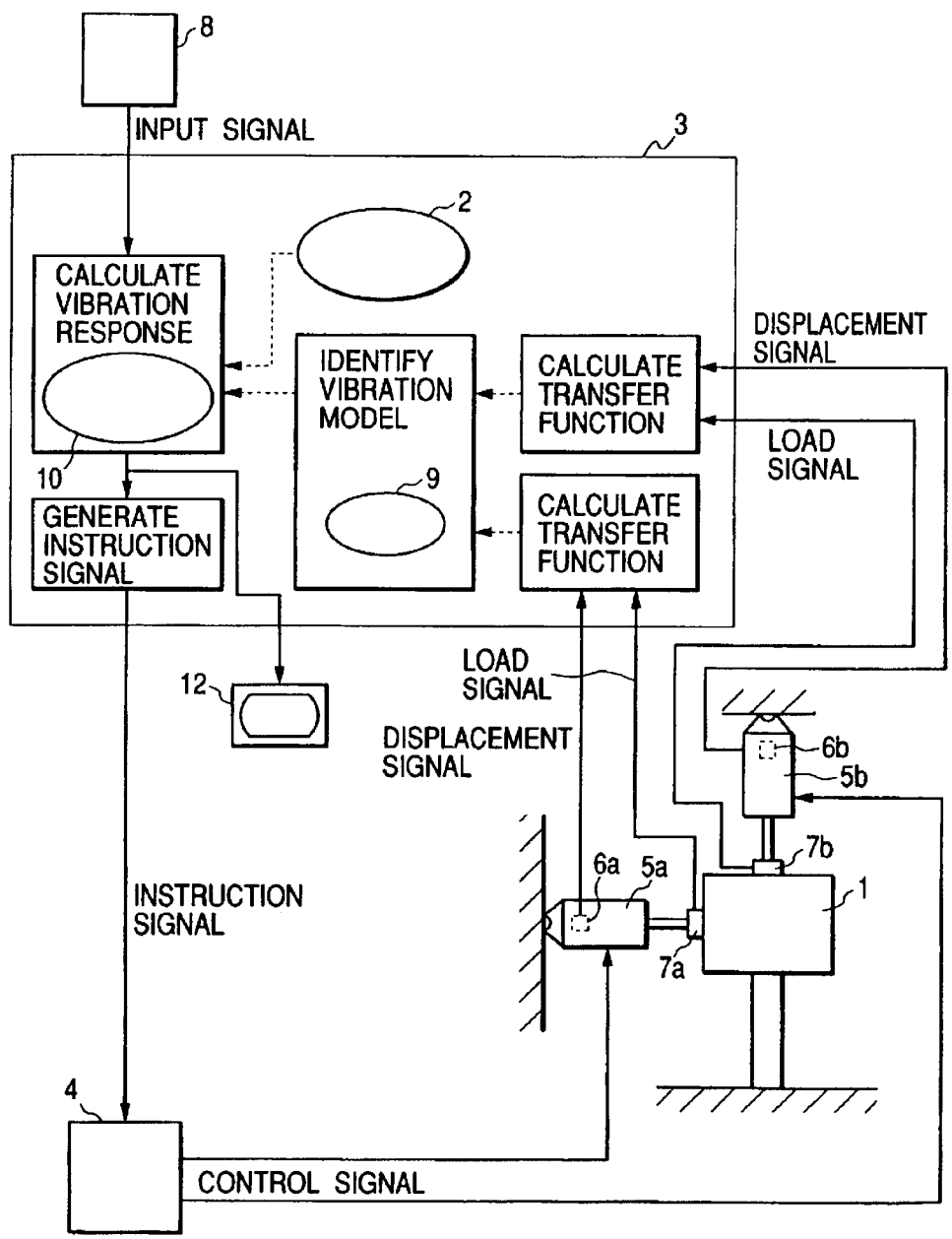
FIG. 7 is a schematic diagram showing another embodiment of the shaking test apparatus according to the present invention.

FIG. 7 shows a case where the shaking is applied in two directions.

In FIG. 7, the shaker 5a is mounted in the horizontal direction and the shaker 5b is mounted in the vertical direction. Until the calculation of the transfer function, the calculation is performed for every shaking direction, and the vibration model 9 of the partial structure 1 is identified on the basis of the two transfer functions in the horizontal direction and the vertical direction. The vibration model 9 and the numerical model 2 are combined with each other to construct the overall-system model 10, and then the overall-system model 10 thus constructed is used for the calculation of the response. The vibration model 9 is renewed every time the transfer function obtained is renewed, and the overall-system model 10 is successively corrected.

Even when the number of degrees of freedom increases, the method of the present invention can be applied by repeating the above process.

FIG. 7 shows the case where the two degrees of freedom, i.e., the horizontal and vertical directions are set, however, the shaking directions and the number of the shaking directions are not limited to the above embodiments, and the number of shakers and the mount directions thereof may be freely altered in accordance with the degree of freedom of estimation.

In the above embodiment, the partial structure 1 may be preliminary shaken by random wave or the like prior co the shaking operation of the present invention to identifying the vibration model 9. That is, a result obtained by the preliminary shaking operation is set as an initial value for the vibration model 9 of the partial structure of the main shaking operation to perform the shaking test. In this case, even when all parameters of the partial structure are unclear, the main shaking operation can be started under a state which is near to the actual one to some extent, and thus the testing time can be shortened. Further, the input signal 8a may be input to the computer 3 by the input means 13 in advance to be read in simultaneously with the start of the test.

In the above embodiments, the computer is preferably a digital computer. The process of calculating the transfer function from the measured value and then identifying the vibration model of the partial structure and the process of building the overall-system model and calculating the vibration response may be performed by different processing units. Further, a hydraulic shaker, an electromotive shaker or the like may be used as the shaker for shaking the partial structure.

In the above embodiments, the displacement gauge contained in the shaker is used as the means for measuring the displacement of the partial structure, however, a laser displacement gauge or the like which is provided at the outside may be used. The place where the load cell is mounted for measuring the load is not limited to the gap between the partial structure and the shaker, and it may be mounted at any place so long as it can measure the load. In addition, the load measuring means is not limited to a load cell. As described above, the construction of the present invention is not limited to the above embodiments, and various modifications or constructions may be made or designed without departing from the subject matter of the present invention.

As described above, according to the present invention, a structure as a test target is constructed by a partial structure (s) and a numerical model, a vibration model is created for the partial structure on the basis of the shaking test, and then the vibration model and the numerical model are combined with each other to construct an overall-system model which can be operated in the computer. Thereafter, a vibration response is calculated for the overall-system model, and the overall-system model is corrected on the basis of the calculation result. The above operation procedure is repeated. Accordingly, for even a structure having a non-linearity or the like, a vibration response which is near to the vibration response of the actual structure can be calculated. Therefore, the overall-system model thus obtained can be made to closely approach the actual structure with high precision. Further, the portion to be shaken can be reduced, so that the shaking test can be easily performed and this is economical.

What is claimed is:

1. A calculating device provided for a shaking test apparatus for carrying out a shaking test on a structure by using a partial structure and a numerical model which is virtually connected to the partial structure, comprising a calculation part, wherein said calculation part identifies a vibration model corresponding to the partial structure on the basis of displacement and reaction force detected in response to shaking, combines the vibration model and the numerical model with each other to construct a model of the overall system corresponding to the structure, and calculates the shaking response of the overall system model.

2. A constructing apparatus of an overall system model comprising:
   a vibration model which is a numerically model of a partial structure; and
   a numerical model which is virtually connected to the partial structure and which is a model of a remainder of the structure;
   wherein said vibration model corresponds to the partial structure and is identified with displacement and reaction force of the partial structure when the partial structure has undergone a shaking test, and the overall system model is constructed by the vibration model and the numerical model.

3. A constructing method of an overall system model having a vibration model which is a numerically modeling of a partial structure and a numerical model which is virtually connected to the partial structure and is a modeling of the remainder of the structure comprising:
   generating the vibration model corresponds to the partial structure on the basis of displacement and reaction force of the partial structure when the partial structure has undergone a shaking test;
   generating the overall system model by arranging the vibration model and the numerical model; and
   identifying the overall system model by renewing the overall system model after calculating the shaking response of the overall system model.

* * * * *